(12) United States Patent
Siddiqui et al.

(10) Patent No.: US 10,589,778 B2
(45) Date of Patent: Mar. 17, 2020

(54) METHOD AND SYSTEM FOR ACTIVE STEERING FOR START-STOP EVENTS

(71) Applicant: Ford Global Technologies, LLC, Dearborn, MI (US)

(72) Inventors: Siraj Siddiqui, Lasalle (CA); Ahmed Awadi, Farmington Hills, MI (US); Hussam Makkiya, Troy, MI (US); Hafiz Shafeek Khafagy, Dearborn, MI (US); Garrett Tietz, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 256 days.

(21) Appl. No.: 15/871,219

(22) Filed: Jan. 15, 2018

(65) Prior Publication Data
US 2019/0217884 A1   Jul. 18, 2019

(51) Int. Cl.
B62D 6/00 (2006.01)
B62D 5/00 (2006.01)
B60W 10/06 (2006.01)
B60W 10/20 (2006.01)
B60W 30/18 (2012.01)
B62D 5/04 (2006.01)

(52) U.S. Cl.
CPC ............ B62D 6/006 (2013.01); B60W 10/06 (2013.01); B60W 10/20 (2013.01); B60W 30/18172 (2013.01); B62D 5/008 (2013.01); B62D 5/046 (2013.01); B62D 5/0481 (2013.01); B62D 6/008 (2013.01); B60W 30/18018 (2013.01); B60W 2520/26 (2013.01); B60W 2550/12 (2013.01); B60W 2550/148 (2013.01); B60W 2710/207 (2013.01)

(58) Field of Classification Search
CPC ...................................................... B62D 6/006
See application file for complete search history.

(56) References Cited

U.S. PATENT DOCUMENTS

| 6,896,092 B2 * | 5/2005 | Stall ......................... B62D 5/09 180/403 |
| 8,170,750 B2 * | 5/2012 | Katrak ................... B62D 6/002 180/422 |
| 8,418,801 B2 * | 4/2013 | Izutani ................. B62D 5/0481 180/446 |
| 8,788,178 B2 | 7/2014 | Pebley et al. |
| 9,353,693 B2 | 5/2016 | Kato |

(Continued)

FOREIGN PATENT DOCUMENTS

| DE | 102010013180 A1 | 9/2011 |
| GB | 2539258 A | 12/2016 |

OTHER PUBLICATIONS

US 9,421,996 B2, 08/2016, Sugiyama et al. (withdrawn)

*Primary Examiner* — Alex C Dunn
(74) *Attorney, Agent, or Firm* — David Kelley; Brooks Kushman, P.C.

(57) ABSTRACT

A vehicle is provided. The vehicle may include an engine that is configured to auto-stop and auto-start. The system may also include a controller programmed to power an electrical actuator coupled to a steering mechanism to synchronize a drive angle of the vehicle and a steering wheel angle of the vehicle, in response to a parameter indicative of a likelihood of a wheel slip event exceeding a threshold and the steering-wheel angle being greater than a predetermined threshold.

18 Claims, 4 Drawing Sheets

(56) References Cited

U.S. PATENT DOCUMENTS

| | | | |
|---|---|---|---|
| 9,499,195 B2 * | 11/2016 | Malone | B62D 5/008 |
| 2008/0065292 A1 * | 3/2008 | Katrak | B62D 5/008 |
| | | | 701/41 |
| 2010/0114431 A1 * | 5/2010 | Switkes | B60T 8/17557 |
| | | | 701/41 |
| 2011/0137513 A1 * | 6/2011 | Watanabe | B60W 30/045 |
| | | | 701/31.4 |
| 2012/0101686 A1 * | 4/2012 | Kumano | B60R 25/02 |
| | | | 701/42 |
| 2012/0330508 A1 * | 12/2012 | Pebley | B62D 5/0481 |
| | | | 701/41 |
| 2013/0001006 A1 * | 1/2013 | Gibson | B62D 5/0481 |
| | | | 180/446 |
| 2013/0066507 A1 * | 3/2013 | Yamane | B60R 16/0232 |
| | | | 701/22 |
| 2013/0158806 A1 * | 6/2013 | Sugiyama | B62D 6/02 |
| | | | 701/41 |
| 2013/0245925 A1 | 9/2013 | Malone et al. | |
| 2013/0253766 A1 * | 9/2013 | Kimura | B62D 5/0463 |
| | | | 701/41 |
| 2013/0319164 A1 * | 12/2013 | Inoue | B62D 1/16 |
| | | | 74/495 |
| 2014/0067217 A1 * | 3/2014 | Stares | B60K 23/0808 |
| | | | 701/69 |
| 2014/0074368 A1 * | 3/2014 | Stares | B60K 17/34 |
| | | | 701/69 |
| 2014/0100750 A1 * | 4/2014 | Stares | B60K 17/34 |
| | | | 701/69 |
| 2015/0353151 A1 * | 12/2015 | Klews | B62D 37/06 |
| | | | 74/5.22 |
| 2017/0088135 A1 * | 3/2017 | Kelly | B60W 30/143 |
| 2017/0203784 A1 | 7/2017 | Jeannin | |

* cited by examiner

METHOD AND SYSTEM FOR ACTIVE STEERING FOR START-STOP EVENTS

TECHNICAL FIELD

This disclosure relates to a vehicle system for steering a vehicle during a start-stop event and a method of operating the same.

BACKGROUND

Fuel economy and emissions performance of an automobile is an important characteristic. A higher fuel economy and lower emissions rating may make a vehicle more attractive to potential buyers and may help an automotive manufacturer meet fuel economy and emissions standards imposed by local governments. For traditional gasoline or diesel vehicles, one method of reducing fuel consumption is the use of a micro-hybrid or start-stop powertrain system that selectively turns its engine off (auto-stop event) during portions of a drive cycle.

Some vehicles include an active front steering (AFS) system to improve steering performance. The AFS system may be electro-mechanical and include an electronically controlled motor and gear assembly that superimposes additional steering angle based primarily on vehicle speed and steering wheel angle. Under certain conditions, such as an auto-stop event, the AFS motor is stopped or frozen so movement of the steering wheel does not alter the position of the wheels. When the AFS motor is frozen, the AFS motor will hold the current position regardless of additional movement of the steering wheel. Because the AFS motor holds the angle of the vehicle wheels, movement of the steering wheel may cause a mismatch or error between the steering wheel and the vehicle wheels.

SUMMARY

According to one embodiment of this disclosure, a method of controlling an active steering system is provided. The method may include powering by a controller an electrical actuator coupled to a steering mechanism to synchronize a drive angle of the vehicle and a steering wheel angle of the vehicle, responsive to a parameter indicative of a wheel slip event exceeding a threshold and the steering-wheel angle being greater than a predetermined threshold.

According to another embodiment of this disclosure, a vehicle system is provided. The system may include an engine that is configured to auto-stop and auto-start. The system may also include a controller programmed to initiate an auto-start of the engine responsive, to a difference between a steering-wheel angle and a drive angle being greater than a predetermined threshold.

According to yet another embodiment of this disclosure, a vehicle is provided. The vehicle may include an engine that is configured to auto-stop and auto-start. The system may also include a controller programmed to power an electrical actuator coupled to a steering mechanism to synchronize a drive angle of the vehicle and a steering wheel angle of the vehicle, responsive to a parameter indicative of a wheel slip event exceeding a threshold and the steering-wheel angle being greater than a predetermined threshold.

DETAILED DESCRIPTION

Figure 1:
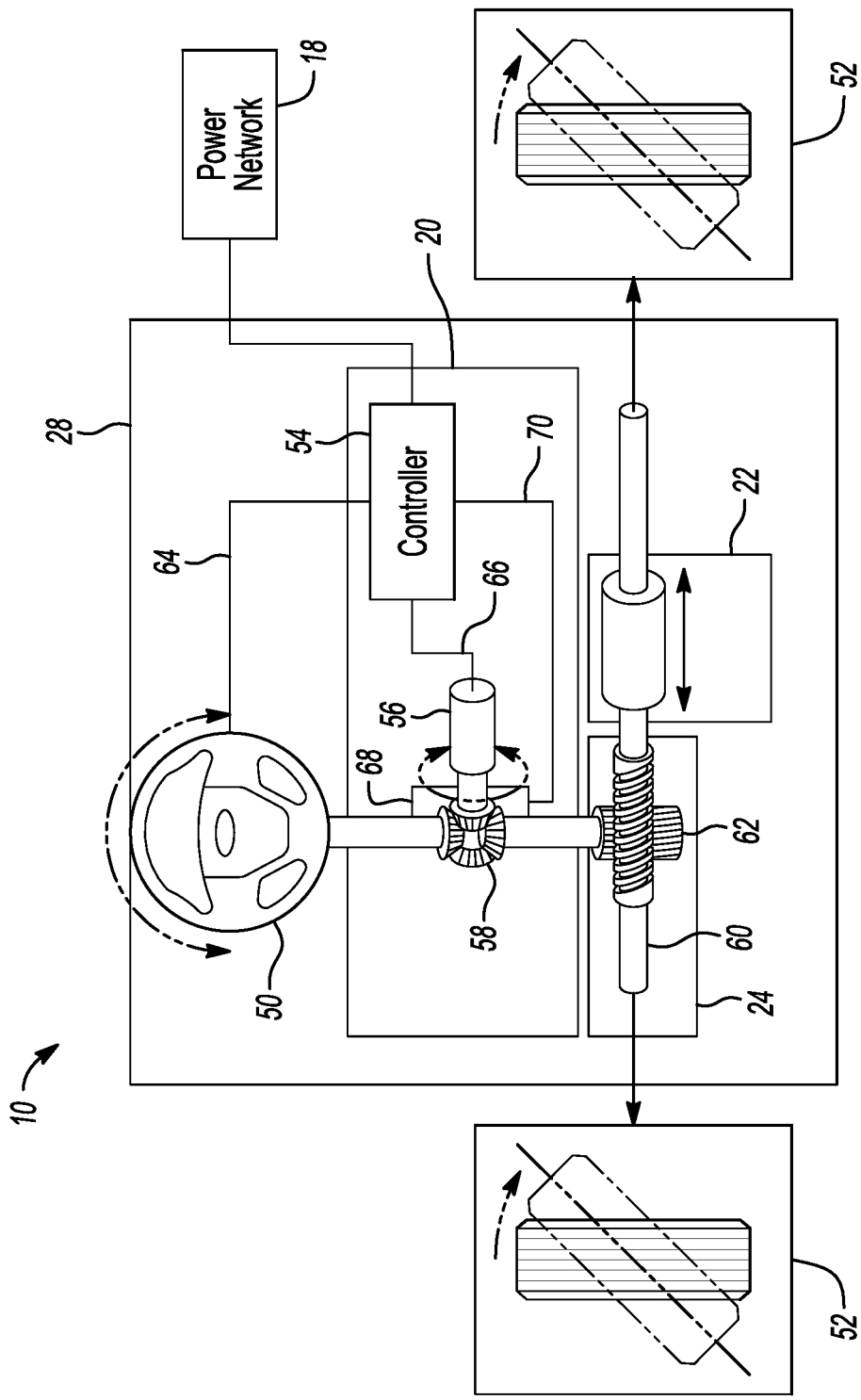
FIG. 1 is a diagram of an exemplary steering system that includes active front steering.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Under certain circumstances, an angle of a steering wheel and an angle of the vehicle's wheels (e.g., drive angle) may be mismatched. Synchronizing the drive angle and the steering-wheel angle may be more difficult under low traction conditions. To correct this mismatch condition, a controller may power an electrical actuator that is coupled to a steering mechanism to synchronize a drive angle of the vehicle and a steering-wheel angle of the vehicle.

An objective of the controller of a start-stop vehicle powertrain may include stopping an engine such as an internal combustion engine, (e.g., a gasoline engine or a diesel engine). The controller may be used to stop the engine by inhibiting an ignition coil of the engine or by inhibiting the injection of fuel into engine cylinders. The controller may stop the engine based on input from vehicle sensors. The signals from the sensors may be indicative of a speed of the vehicle, a force applied to a brake pedal (or absence thereof), a force applied to an accelerator pedal (or absence thereof), an angle of inclination of the vehicle, the weight of the vehicle, or other vehicle characteristics. An extension of a traditional start-stop is a rolling start-stop system (RSS).

A traditional start-stop system may be configured to auto-stop the engine when the vehicle is not in motion (e.g., 0 mph), a force is applied to the brake pedal, and the voltage level for the vehicle battery is above a threshold. The threshold is selected based on the energy required to start the engine via an electric starter. Once the engine is stopped, the controller may automatically start the engine if the gear selector is in drive and there is an absence of force applied to the brake pedal. In other embodiments of a start-stop vehicle, the controller may be configured to auto-stop the engine when the vehicle is in motion at a speed below a low speed threshold (e.g., 2 mph or 4 mph), a force is applied to the brake pedal, and the voltage level for the vehicle battery is above a threshold. Along with the traditional start-stop control system, a vehicle may be configured to start-stop the engine when the vehicle is in motion above a lower threshold. This system is also referred to as a rolling start-stop system (RSS).

An RSS may have additional benefits such as an improved fuel economy rating, improved vehicle emissions, and reducing engine noise. These benefits may be in addition to the improvements from a conventional start-stop system. An RSS allows the engine to auto-stop at a higher vehicle speed once a driver applies the brakes, the vehicle speed is less than an upper vehicle speed threshold, a torque converter clutch of the transmission is open, and the transmission is in the appropriate gear.

Producing energy by the engine only when needed/required is one of the main approaches to maximizing fuel economy while minimizing emissions in vehicles equipped with internal combustion engines. Accordingly, RSS systems are being considered for implementation across a range of modern vehicles for all of the world's key markets. A RSS system may include a battery system that may be implemented a single battery, dual batteries, any number of batteries. The battery system may have an operating voltage approximately equal to a standard vehicle battery (i.e., 12 Volts) or may operate at other voltages (e.g., 24V, 48V, etc.) RSS systems may utilize any combination of same or different technologies of batteries or power sources such as Lead Acid, Enhanced Flooded (EFB), Absorbent Glass Mat (AGM), LI-Ion or any other battery technology.

One of the challenges with implementing the RSS technology in vehicles is controlling the steering system of the vehicle during low power situations (auto-stop event). When the vehicle is stopped there may not be sufficient energy to power the AFS motor to adjust the drive angle of the vehicle's wheels to match the angle of the steering wheel. This challenge may be further complicated when the vehicle is operating on a low-friction surface, e.g., snow, rain, or ice. Sensors configured to detect such conditions may communicate with a controller to alter the AFS and RSS systems.

Referring to FIG. 1, a diagram of an exemplary steering system 28 for a vehicle 10, is illustrated. The steering system 28 may include an Active Front Steering (AFS) module 20. The AFS module 20 may assist in driving the steering mechanism 24 to vary a gear ratio at which the wheels turn in response to rotation of a steering wheel. For example, at lower vehicle speeds, a low gear ratio may be implemented such that the steering wheel is turned less for a given steering angle. This allows for sharp turns to be made with less steering wheel input. At higher vehicle speeds, the gear ratio may be increased such that the steering wheel is turned more for a given steering angle. This reduces the sensitivity of the steering system 28 to changes in the steering wheel at higher speeds. The net effect is that, at higher speeds, the wheels turn less in response to rotation of the steering wheel.

The steering system 28 may include an Electric Power Assisted Steering (EPAS) module 22 that may work in conjunction with the steering mechanism 24. The EPAS module 22 may assist in driving the steering mechanism 24 to reduce the amount of operator effort required to steer the vehicle 10. The EPAS module 22 may include an electric motor that assists driving the steering mechanism 24. The EPAS module 22 may add torque, in addition to the torque provided by the operator, to change the direction of the front wheels.

The steering system 28 may include a steering wheel 50 that is operated by the operator. The steering system 28 may convert the steering wheel 50 motion into a displacement of the front wheels 52 to cause a change in direction of the vehicle 10. The steering mechanism 24 may be a rack 60 and pinion 62 configuration in which the front wheels 52 are coupled to the rack 60 and the steering wheel 50 is coupled to the pinion 62.

The AFS module 20 may include an electric actuator or electric machine 56 coupled to a helical or planetary gear set 58. The electric machine 56 may cause the pinion 62 to rotate which may cause the rack 60 to move and cause the front wheels 52 to change direction. The steering wheel 50 may be coupled through the AFS gear set 58 as well. A variable gear ratio between the steering wheel 50 and the wheels 52 may be caused by operating the AFS module 20 to drive the pinion 62 as the steering wheel 50 is turned. The gear ratio may be a ratio between the steering wheel angle and an angle at which the wheels turn (e.g., a drive angle). A controller 54 may receive a steering wheel angle input signal 64 indicative of a position of the steering wheel 50 and may produce one or more output signals 66 to operate the electric machine 56. Additional inputs and outputs may be utilized by the controller 54. The controller 54 may communicate with other controllers, such as an engine controller or a vehicle system controller.

The controller 54 may be programmed to monitor the steering wheel angle input signal 64 from the steering wheel 50. The controller 54 may also be programmed to monitor the drive angle. For the purposes of this disclosure, "drive angle" means the current position of the wheels 52. The controller 54 may determine an AFS the positional difference between the steering wheel angle and the drive angle (e.g., AFS error). Based on the AFS error, the controller 54 may determine a demand current for the electric machine 56. The controller 54 may control the current through the electric machine 56 via the output signals 66.

The AFS module 20 may include a locking mechanism 68. The locking mechanism 68 may be a solenoid actuated device that, when actuated, prevents the electric machine 56 from rotating the pinion 62. When the locking mechanism 68 is engaged, the AFS module 20 cannot assist in steering the vehicle and steering is accomplished using the steering wheel 50 output. The locking mechanism 68 may be controlled by an output signal 70 from the controller 54.

The EPAS 22 and AFS 20 modules are coupled to the power network 18 and derive electrical power from the electric machine 14 or the battery 16. During operation, the EPAS 22 and AFS 20 modules may draw a significant amount of current from the power network 18. Under conditions in which the engine 102 is running and the electric machine 14 is supplying electrical power to the power network 18, the energy stored in the battery 119 may not be depleted. However, when the engine 102 is not running, electrical power is provided by the battery 119. The result may be a drop in voltage of the power network 18 which may negatively impact the EPAS 22 or AFS 20 modules. For example, the voltage may drop low enough so that the EPAS 22 or AFS 20 modules cannot function adequately.

Figure 2:
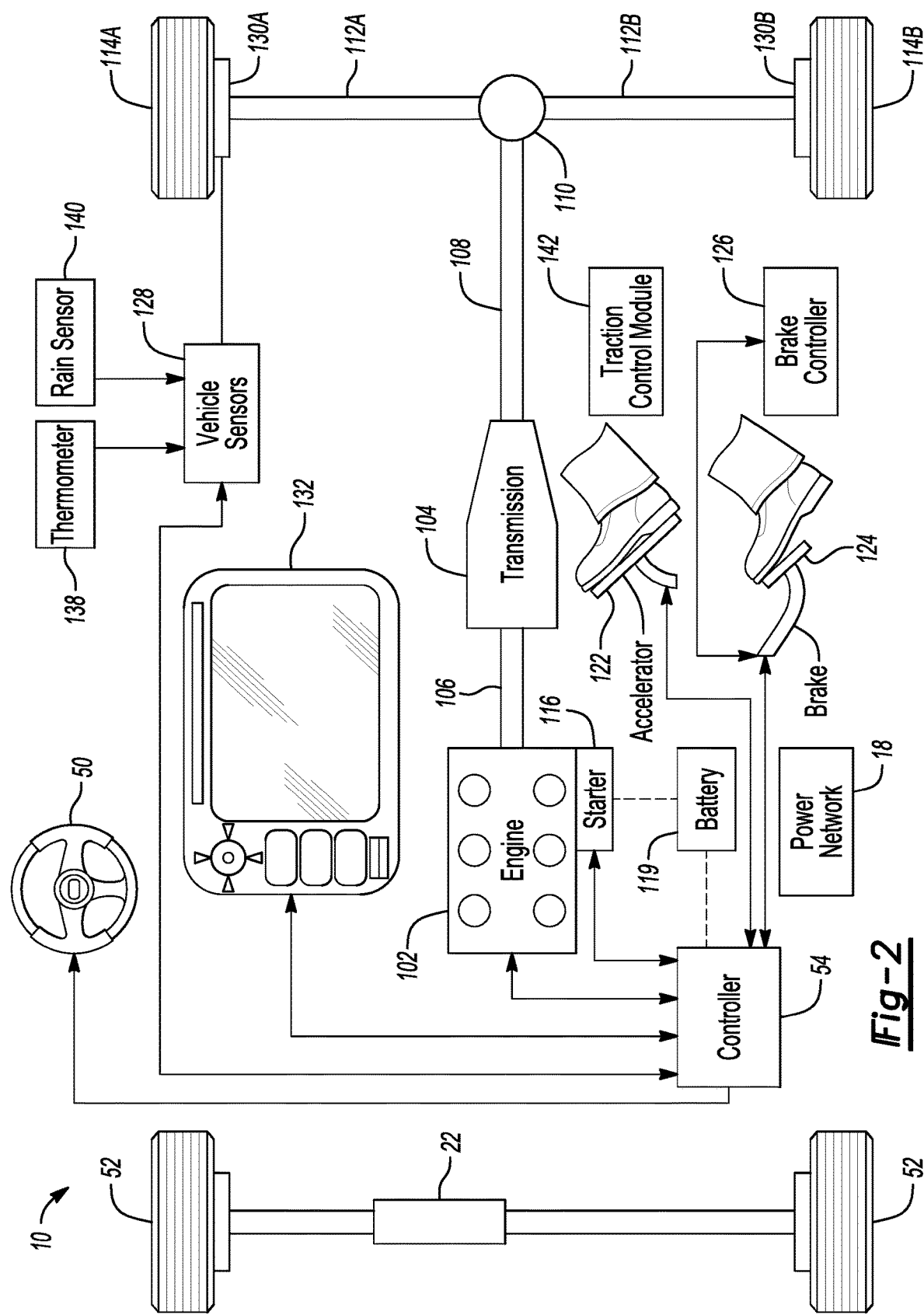
FIG. 2 is a diagram of an exemplary stop/start vehicle illustrating typical components.

Referring to FIG. 2, a micro-hybrid vehicle 10 (also known as a start-stop vehicle) includes an engine 102 and a transmission 104. A crankshaft of the engine 102 is drivably connected to the transmission input shaft 106 to transmit power from the engine to the transmission. The transmission 104 includes an output shaft 108 that is drivably connected to a differential 110. The differential 110 selectively provides power to the driven wheels 114A and 114B via one or more axles—such as half shafts 112A and 112B. In some embodiments, the differential 110 is disposed within the transmission housing. The vehicle 10 also includes an engine-starter motor 116 that is configured to rotate the crankshaft to turn-over the engine 102 in response to an engine-start signal from the controller 54. The engine-starter motor 116 may be an enhanced starter motor that is specifically designed for the increased duty cycle associated with a micro-hybrid vehicle. The starter 116 is powered by a battery 119, which may be a 12-volt battery, 24-volt battery, 48-volt battery or other low voltage battery or high-voltage battery.

A low voltage battery is a battery with a DC voltage less than 100 Volts, a high voltage battery is a battery with a DC voltage equal to or greater than 100 Volts. In some embodiments, the engine may include multiple starter motors. A first starter motor may engage a ring gear of the flywheel to turn the engine over. A second motor may connect to the crankshaft pulley by belt, chain, or other means known in the art. Specifically in the case of RSS, the vehicle may have a dual battery system, i.e., a 12-volt battery for cranking and a 12-volt battery to support electrical loads when the engine is off and vehicle is moving. The two batteries are typically isolated by a disconnect switch.

An accelerator pedal 122 provides operator input to control a speed of the vehicle 10. The pedal 122 may include a pedal-position sensor that provides a pedal-position signal to the controller 54, which provides control signals to the engine 102.

A brake pedal 124 provides operator input to control the brakes of the vehicle. The brake controller 126 receives operator input through a brake pedal 124, and controls a friction brake system including wheel brakes 130A and 130B, which is operable to apply a braking force to the vehicle wheels such as vehicle wheel 114A and vehicle wheel 114B. The pedal 124 may include a pedal-position sensor that provides a pedal-position signal to the controller 54. The vehicle may include an electric-parking brake that is in communication with the controller 54. The controller 54 is programmed to automatically engage the parking brake when desired.

In another embodiment, the vehicle may be equipped with a manual transmission and associated clutch pedal (not illustrated). Like the pedal 124 mentioned above, the clutch pedal may be equipped with a pedal sensor that provides a pedal-position signal to the controller 54.

The controller 54 may be a plurality of controllers that communicate via a serial bus (e.g., Controller Area Network (CAN), FlexRay, Ethernet, etc.) or via dedicated electrical conduits. The controller generally includes any number of microprocessors, microcontrollers, ASICs, ICs, volatile (e.g., RAM, DRAM, SRAM, etc.) and non-volatile memory (e.g., FLASH, ROM, EPROM, EEPROM, MRAM, etc.) and software code to co-act with one another to perform a series of operations. The controller may also include predetermined data, or "look up tables" that are based on calculations and test data, and are stored within the memory. The controller may communicate with other vehicle systems and controllers over one or more wired or wireless vehicle connections using common bus protocols (e.g., CAN, LIN, Ethernet, etc.). Used herein, a reference to "a controller" refers to one or more controllers.

As noted above, embodiments of the present invention include a control system for controlling a start-stop system for an engine in a vehicle, such as the engine 102 and the vehicle 10. Such a control system may be embodied by one or more controllers, such as the controller 54. One goal of a vehicle start-stop system is to automatically stop the engine under certain conditions, while restarting it automatically when conditions change. This provides greater fuel economy and reduced emissions.

In some start-stop systems, the engine may be automatically stopped ("auto stopped") when all of or a certain set of conditions are met. For example, if the gear lever is in DRIVE, the brake pedal is pressed, the accelerator pedal is released, and the vehicle speed is zero, the engine 102 may be automatically stopped. Another condition that may be included in this set of conditions is that none of the vehicle subsystems (e.g., air conditioning or power steering) require the engine to be running. In a start-stop system where all conditions are required to be met before the engine is auto stopped, not only will the start-stop system inhibit the engine from being automatically stopped if any of the conditions in the set are not met, but once having been auto stopped, the engine may be automatically restarted if any of the conditions change.

Continuing with the example from above, one of the common conditions to stopping an engine is a speed or velocity of the vehicle being zero. Often, an engine will not be stopped while the vehicle is in motion. In some systems, the vehicle velocity may be greater than zero, but less than a lower speed threshold such as 1.5 mph or 3.5 mph. Here, a rolling start-stop system allows the engine 102 to be auto-stopped if the speed of the vehicle is within a speed range.

Another vehicle characteristic to consider when calculating an engine shut off point is a capacity and pressure of a vacuum reservoir used to provide brake boost vacuum assistance. The upper threshold speed may be selected from a range of speeds such as 15 mph. to 60 mph. The ability of the vehicle to steer and stop is dependent upon many conditions of the vehicle including speed, weight, angle of inclination, brake conditions, road conditions, and tire conditions. As these conditions change, the ability of the vehicle to steer and stop also changes. For example, a vehicle traveling downhill is more difficult to stop than if the vehicle was traveling uphill. Therefore, a controller 54 may be configured to set a fixed lower threshold based on a lower speed to guard against a range of the conditions that affect a vehicle's stopping. Also, the controller 54 may be configured to set a fixed upper threshold based on an upper speed to guard against a range of the conditions that affect a vehicle's stopping. Alternatively, the controller 54 may be configured to dynamically change the lower threshold and upper thresholds based on the conditions of the vehicle at a point in time.

The vehicle 10 may be equipped to detect or determine the presence of a low-friction road surface. The presence of a low-friction surface may result in the wheels 52 slipping or spinning and subsequently the prohibiting the vehicle from reaching the demanded speed. More specifically, the vehicle 10 may include a temperature sensor 138 that communicates with the vehicle sensors 128 and controller 54. If the ambient temperature surrounding the vehicle 10 is below a threshold (e.g., 32 degrees Fahrenheit) the controller 54 may determine the likelihood of a wheel slip event. The vehicle may also include a rain sensor 140 that communicates with the vehicle sensors 128 and controller 54. If rain or other precipitation (e.g. snow, sleet, or ice) is detected the controller 54 may determine the likelihood of a wheel slip event. The vehicle may also include a traction control module 142. The traction control module 142 may include an anti-lock brake system capable of detecting sliding or wheel slip. Moreover, the traction control module 142 may include wheel speed sensors that measure the rotational speed of the wheels 52 and 114. The traction control module 142 or controller 54, or both may detect a difference in rotational speed between the wheels 52 and 114. If one or more of the wheels, e.g. 52a is spinning faster than the other wheels, e.g. 52b, 114a, or 114b, a slip condition may be detected.

The controller 54 may also be configured to dynamically change the vehicle speed threshold based on the conditions of the vehicle at a future point in time. For example, a navigation system or a human-machine interface (HMI) including a navigation system 132 may be coupled with the controller 54 such that a route may be provided to controller.

The route may include a change in elevation along the route and adjust the upper and lower speed thresholds according to the changes in potential braking along the route. The route may also include changes in posted speeds that are indicative of locations at which brakes may be applied to reduce the speed, or an accelerator pedal may be used to increase the speed. The route may include locations at which a potential stopping point is, such as static locations and dynamic locations. A static location at which a potential stopping point is, includes a traffic light, a stop sign, a round-about, or a yield sign. A dynamic location at which a potential stopping point is along the route includes locations associated with traffic congestion, weather conditions, road construction, or accidents. The route displayed by the navigation system within the HMI 132 may be based on map data that has been preloaded in the memory of the HMI 132, or the HMI 132 may receive data streamed from a remote server. The data may be streamed wirelessly using cellular, Wi-Fi or other standard technology. Based on the route, changes in elevation, and potential stopping points along the route the controller 54 may adjust the voltage level of the starter battery 118 to maintain a state of charge of the starter battery 118. This adjustment reserves power for electrical accessories that are powered by the battery 118 including electric power steering (EPS), electric power brakes, electric stability control (ESC), and other vehicle dynamic systems.

Figure 3:
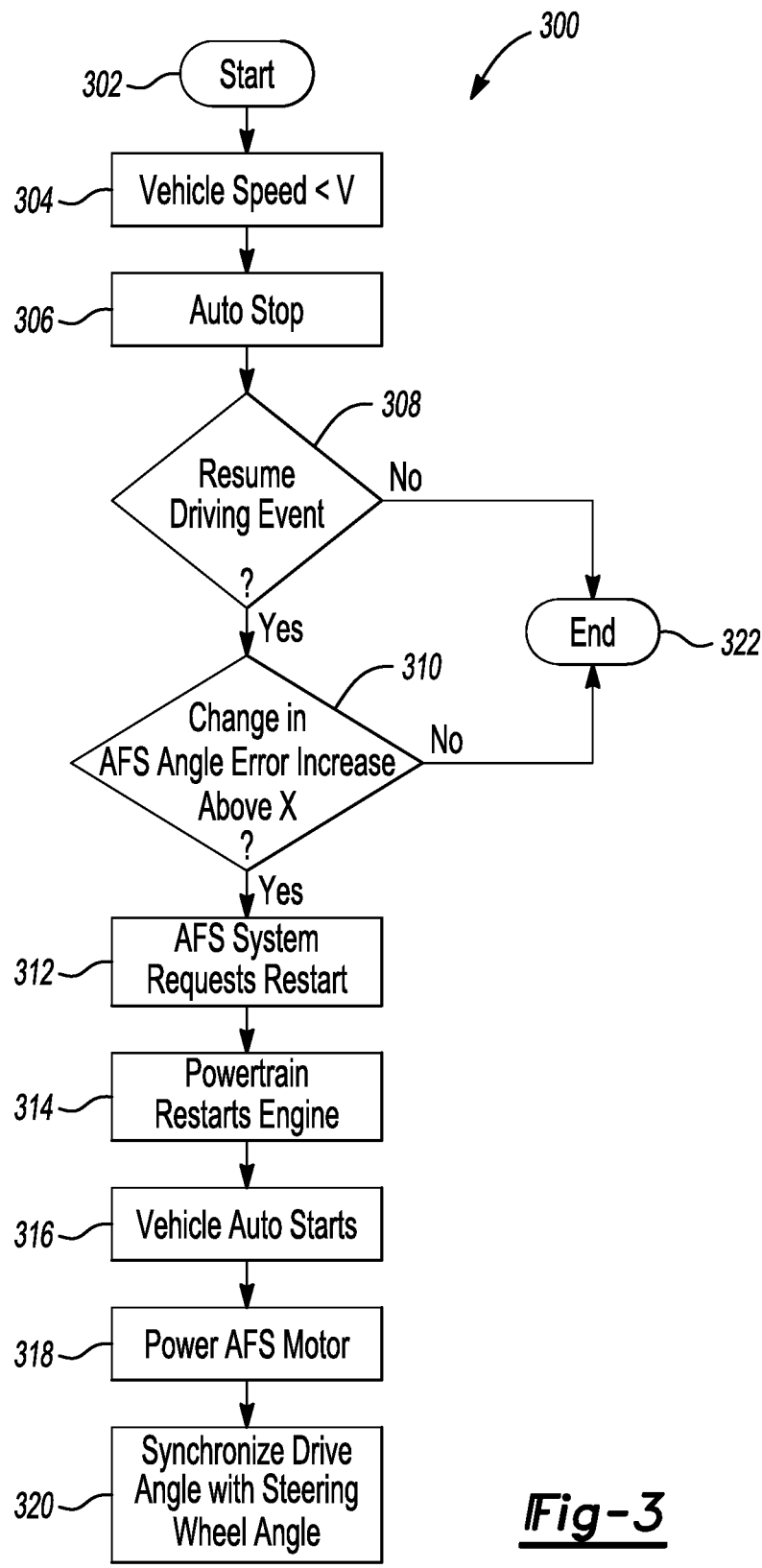
FIG. 3 is a flowchart of operating the stop/start vehicle and associated steering system according to a first embodiment of this disclosure.

Now referring to FIG. 3, a flowchart illustrating operation of a system or method 300 of the active front steering system 28 and the start-stop system of the vehicle 10 is illustrated. As previously described, various functions or processes illustrated may be performed in a different order, may be omitted, or may be repeatedly performed although not explicitly illustrated or described to accomplish various features and advantages described herein as those of ordinary skill in the art will understand.

Controlling or operating the active front steering system 28 and the start-stop system of the vehicle 10 may start at operation 302. As the speed of the vehicle decreases below a threshold V, as represented by operation 304, the controller 54 may auto-stop the vehicle 10, as represented by operation 306. The controller 54 may receive a signal indicative of resuming driving, as represented by operation 308. The signal may be triggered by a user or driver pressing the accelerator pedal 122, or placing the gear selector in drive and if there is an absence of force applied to the brake pedal.

As previously mentioned, the controller 54 monitors the AFS error, the angular difference between the drive angle (e.g., current wheel position) and the steering wheel angle (as positioned by the driver or operator). The AFS error may change (increase or decrease) under certain circumstances. A relatively small AFS error (0.1 degrees to 5 degrees) may be present if the steering mechanism 24 is not aligned with the steering wheel 50. This may be due to an improper alignment procedure or after one of the wheels 52 hits a pothole or curb. The AFS error may increase after the steering wheel 50 and the wheels 52 are turned before the vehicle 10 is auto-stopped and after the steering wheel 50 is turned in the opposite direction. Alternatively, the AFS error may be caused or increased by adjusting the steering wheel 50 during an auto-stop event. Or the AFS error may be caused by or increased by employing a safety lock while the steering wheel 50 is turned. If the change in AFS error exceeds a threshold x, as represented by operation 310, the controller 54 branches to operation 312.

If the error exceeds the threshold x, the AFS system 28 sends a signal to the controller 54 to auto-start the engine 102, as represented by operation 312. The powertrain or engine 102 restarts, as represented by operation 314, and the vehicle auto starts, as represented by operation 316. Once the vehicle 10 has auto-started, sufficient power is provided to the AFS electrical actuator or motor 56, as represented by operation 318. Once sufficient power is provided to the motor 56, the AFS error may be decreased by synchronizing the drive angle with the steering wheel angle. Synchronizing the drive angle and the steering wheel angle may occur gradually (e.g. 3-20 minutes).

Figure 4:
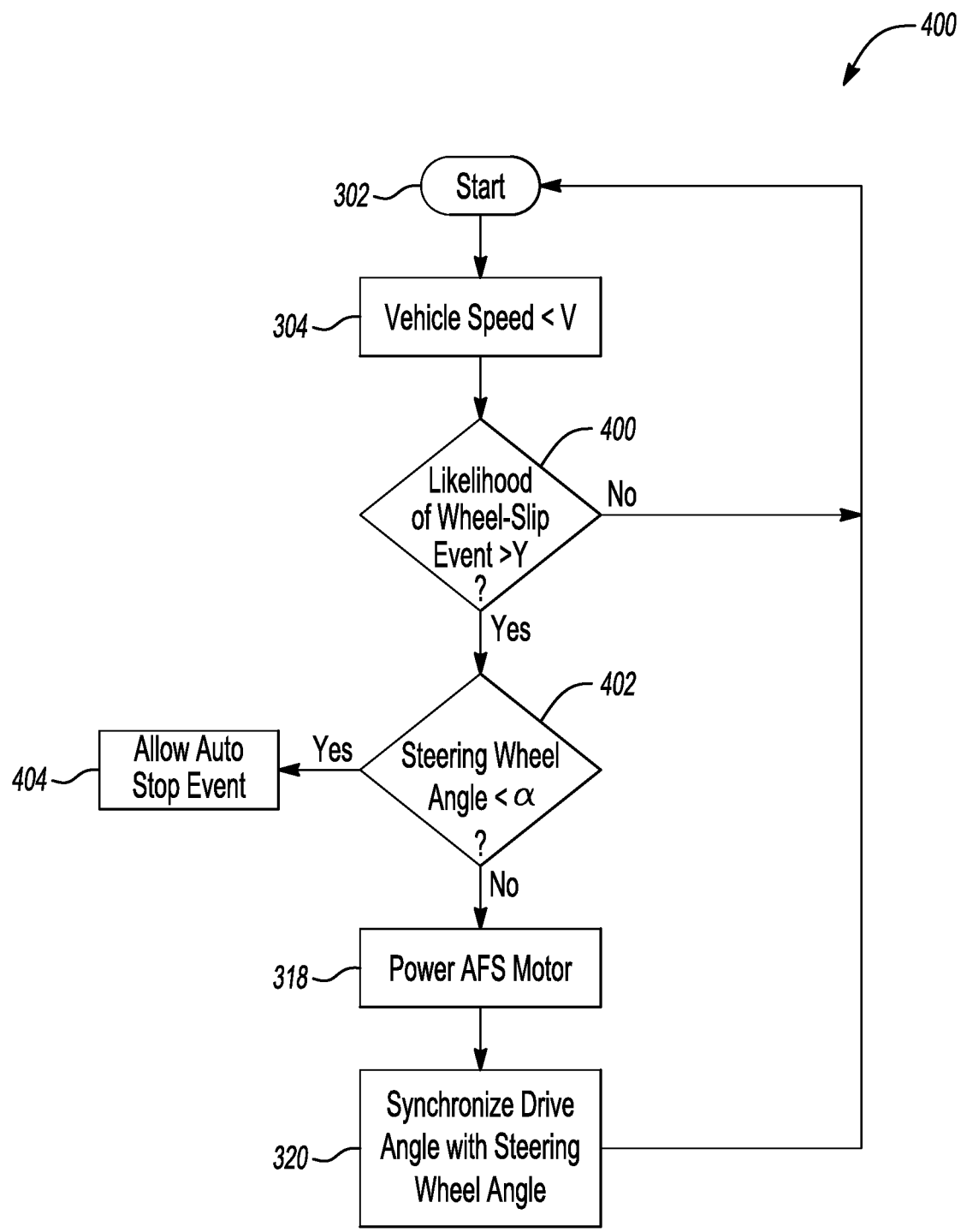
FIG. 4 is a flowchart of operating the stop/start vehicle and associated steering system according to a second embodiment of this disclosure.

Now referring to FIG. 4, a flowchart illustrating operation of a system or method 400 of the active front steering system 28 and the start-stop system of the vehicle 10 according to a second embodiment is illustrated. As previously described, various functions or processes illustrated may be performed in a different order, may be omitted, or may be repeatedly performed although not explicitly illustrated or described to accomplish various features and advantages described herein as those of ordinary skill in the art will understand.

Controlling or operating the active front steering system 28 and the start-stop system of the vehicle 10 may start at operation 302. As the speed of the vehicle decreases below a threshold V, as represented by operation 304, the controller 54 may auto-stop the vehicle 10, as represented by operation 306. The controller 54 may receive a signal indicative of resuming driving, as represented by operation 308. The signal may be triggered by a user or driver pressing the accelerator pedal 122, or placing the gear selector in drive and if there is an absence of force applied to the brake pedal.

The controller 54, the traction control module 142, or some combination thereof, may determine the likelihood of a wheel slip condition, as represented by operation 400. As previously mentioned, the likelihood of a wheel slip condition may be a function of the temperature external to the vehicle, as measured by the temperature sensor 138. The likelihood of a wheel slip condition may depend on the presence of precipitation, as measured by the rain sensor 140. Moreover, the traction control module 142 may detect or predict the wheel slip condition. If the likelihood of the wheel slip condition exceeds a predetermined threshold Y, the controller branches to operation 402.

In another embodiment, the vehicle may be equipped with imaging devices (e.g., cameras) to detect to detect the presence of precipitation on driving surface.

The controller 54, may also determine the angle of the steering wheel angle and whether the steering wheel angle exceeds a threshold $\alpha$, as represented by operation 402. If the steering wheel angle exceeds the threshold $\alpha$, the controller branches to operation 318. The controller 54 may then provide sufficient power to the AFS motor 56, as represented by operation 318. Once the AFS motor 56 is powered, the AFS motor 56 may then be actuated to synchronize the drive angle with the steering wheel angle, as represented by operation 320. Referring back to operation 402, if the steering wheel angle is less than the threshold $\alpha$, the controller branches to operation 404. In operation 404, the controller then allows a subsequent auto-stop event.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling an active steering system for a vehicle comprising:
    powering by a controller an electrical actuator coupled to a steering mechanism to synchronize a drive angle of the vehicle and a steering-wheel angle of the vehicle responsive to a parameter indicative of a likelihood of a wheel slip event exceeding a threshold and the steering-wheel angle being greater than a predetermined threshold.

2. The method of claim 1, wherein the parameter is based on detection of precipitation by a precipitation sensor.

3. The method of claim 1, wherein the parameter is based on a difference in rotational speed between a first wheel and a second wheel.

4. The method of claim 1, wherein the parameter is based on an outside temperature being less than a predetermined temperature threshold.

5. The method of claim 1, further comprising initiating an auto-start after the powering.

6. A vehicle system comprising:
    an engine configured to auto-stop and auto-start; and
    a controller programmed to initiate an auto-start of the engine responsive to a difference between a steering-wheel angle and a drive angle being greater than a first-predetermined threshold.

7. The vehicle system of claim 6, wherein the controller is further programmed to power an electrical actuator to decrease the difference to a second-predetermined threshold less than the first-predetermined threshold responsive to the auto-start of the engine.

8. The vehicle system of claim 7, wherein the controller is further programmed to initiate the auto-start of the engine, responsive to an increase in angle error, a difference between the steering-wheel angle and the drive angle before an auto-stop and the steering-wheel angle and the drive angle after an auto-stop of the engine, exceeding an angle-error threshold.

9. The vehicle system of claim 8, wherein the controller is further programmed to power the electrical actuator to decrease the angle error.

10. The vehicle system of claim 9, wherein the controller is further programmed to command the electrical actuator to adjust angular position of one or more wheels.

11. The vehicle system of claim 9, wherein the controller is further programmed to command the electrical actuator to adjust angular position of a steering wheel mechanism.

12. A vehicle comprising:
    an engine configured to auto stop and auto start; and
    a controller programmed to power an electrical actuator coupled to a steering mechanism to synchronize a drive angle of the vehicle and a steering-wheel angle of the vehicle responsive to a parameter indicative of a likelihood of a wheel slip event exceeding a threshold and the steering-wheel angle being greater than a predetermined threshold.

13. The vehicle of claim 12, wherein the controller is further programmed to power the electrical actuator responsive to a measured temperature, external to the vehicle, being less than a temperature threshold.

14. The vehicle of claim 12, wherein the controller is further programmed to power the electrical actuator responsive to a precipitation sensor sending a signal indicative of a presence of precipitation.

15. The vehicle of claim 12, wherein the controller is further programmed to power the electrical actuator responsive to a difference of wheel speed between at least two of wheels exceeding a wheel-speed-error threshold.

16. The vehicle of claim 12, wherein the predetermined threshold is forty-five degrees.

17. The vehicle of claim 12, wherein the controller is further configured to auto-stop the engine responsive to the steering-wheel angle being less than a predetermined threshold.

18. The vehicle of claim 17, wherein the predetermined threshold is forty-five degrees.

* * * * *